(12) United States Patent
Ma et al.

(10) Patent No.: US 12,390,749 B2
(45) Date of Patent: Aug. 19, 2025

(54) FILTER HOLDER

(71) Applicant: CAWARE FILTERING CORPORATION, Kaohsiung (TW)

(72) Inventors: Wu-Yang Ma, Kaohsiung (TW); Min-Hua Chang, Kaohsiung (TW)

(73) Assignee: CAWARE FILTERING CORPORATION, Kaohsiung (TW)

( * ) Notice: Subject to any disclaimer, the term of this patent is extended or adjusted under 35 U.S.C. 154(b) by 385 days.

(21) Appl. No.: 18/124,747

(22) Filed: Mar. 22, 2023

(65) Prior Publication Data

US 2024/0216841 A1   Jul. 4, 2024

(30) Foreign Application Priority Data

Dec. 30, 2022  (TW) .................................. 111150842

(51) Int. Cl.
*B01D 29/96* (2006.01)
*B01D 29/31* (2006.01)
*B01D 35/30* (2006.01)

(52) U.S. Cl.
CPC ............. *B01D 29/96* (2013.01); *B01D 29/31* (2013.01); *B01D 35/30* (2013.01); *B01D 2201/291* (2013.01); *B01D 2201/305* (2013.01); *B01D 2201/4061* (2013.01)

(58) Field of Classification Search
CPC ........ B01D 29/96; B01D 29/31; B01D 35/30; B01D 2201/291; B01D 2201/305; B01D 2201/4061; B01D 27/00; B01D 2201/4023
USPC ................. 210/440–445, 282, 455, 470, 232
See application file for complete search history.

(56) References Cited

U.S. PATENT DOCUMENTS

2011/0247974 A1* 10/2011 Gale ...................... B01D 35/30
29/428

* cited by examiner

*Primary Examiner* — Madeline Gonzalez
(74) *Attorney, Agent, or Firm* — Birch, Stewart, Kolasch & Birch, LLP

(57) ABSTRACT

A filter holder has an assembling base, a trigger component, and a body. The assembling base includes a mounting portion and a body holder having a connecting hole, a slit, a blocking end, and an engaging groove. The trigger component is connected to the body holder. The body is rotatably connected to the assembling base and has a cap, a connecting tube inserted into the connecting hole of the body holder, and a locking rib able to be located in the slit and the engaging groove. The trigger component is pressed away from the slit to drive the body holder to release an engagement between the engaging groove of the body holder and the locking rib of the body.

10 Claims, 9 Drawing Sheets

FILTER HOLDER

BACKGROUND OF THE INVENTION

1. Field of the Invention

The present invention relates to a filter device, and more particularly to a filter holder configured to be detachably connected to a replaceable filter cartridge.

2. Description of Related Art

With reference to FIG. 9, a conventional filter unit 90 substantially comprises a filter holder 91 and a filter cartridge 93. The filter holder 91 is fixed on a bracket 95 and has a connecting tube 915 to connect with piping. The filter cartridge 93 is detachably connected to the filter holder 91. Fluid in the piping flows into the filter unit 90 via an inlet of the connecting tube 915, flows through the filter cartridge 93 to be filtered by the filter cartridge 93, and then flows out from an outlet of the connecting tube 915.

The filter cartridge 93 is connected to and located below the filter holder 91. To replace the filter cartridge 93, the filter cartridge 93 is moved downwardly relative to the filter holder 91 to detach from the filter holder 91. However, when a room for installing the filter unit 90 is restricted and a bottom of the filter cartridge 93 is too close to a ground, there is no enough space to allow the filter cartridge 93 to be moved downwardly relative to the filter holder 91. The filter cartridge 93 is hard to be directly detached from the filter holder 91 fixed on the bracket 95. To replace the filter cartridge 93, the filter holder 91 needs to be removed from the bracket 95 firstly. Replacing the filter cartridge 93 of the conventional filter unit 90 is inconvenient accordingly.

To overcome the shortcomings, the present invention tends to provide a filter holder to mitigate or obviate the aforementioned problems.

SUMMARY OF THE INVENTION

The main objective of the invention is to provide a filter holder configured to be fixed on a bracket and connected to a filter cartridge. The filter holder and the filter cartridge can be rotated relative to the bracket to provide plenty of room for replacing the filter cartridge.

A filter holder comprises an assembling base, a trigger component, and a body. The assembling base includes a mounting portion configured to be fixed to a bracket and a body holder having a connecting hole, a slit, a blocking end, and an engaging groove. The connecting hole is transversally formed through the body holder. The slit is transversally formed through the body holder, is formed through an external surface and an internal surface of the body holder, and communicates with the connecting hole and an outside of the body holder. The blocking end is located at a side of the slit. The engaging groove is recessed in the body holder, communicates with the connecting hole, and is spaced apart from the slit at an angular interval. The trigger component is connected to the body holder of the assembling base and is adjacent to the blocking end. The body is rotatably connected to the assembling base and includes a cap configured to be connected to a filter cartridge, a connecting tube formed at a top of the cap and inserted into the connecting hole of the body holder, and a locking rib protruding from an external peripheral surface of the connecting tube. Wherein, the body has an initial position and a locking position. When the body is in the initial position, the locking rib of the body is located in the slit of the body holder of the assembling base. When the body is in the locking position, the locking rib is located in and engaged with the engaging groove of the body holder of the assembling base. The trigger component is configured to be pressed away from the slit to drive the body holder for releasing an engagement between the engaging groove of the body holder and the locking rib of the body.

Other objects, advantages and novel features of the invention will become more apparent from the following detailed description when taken in conjunction with the accompanying drawings.

DETAILED DESCRIPTION OF PREFERRED EMBODIMENT

Figure 1:
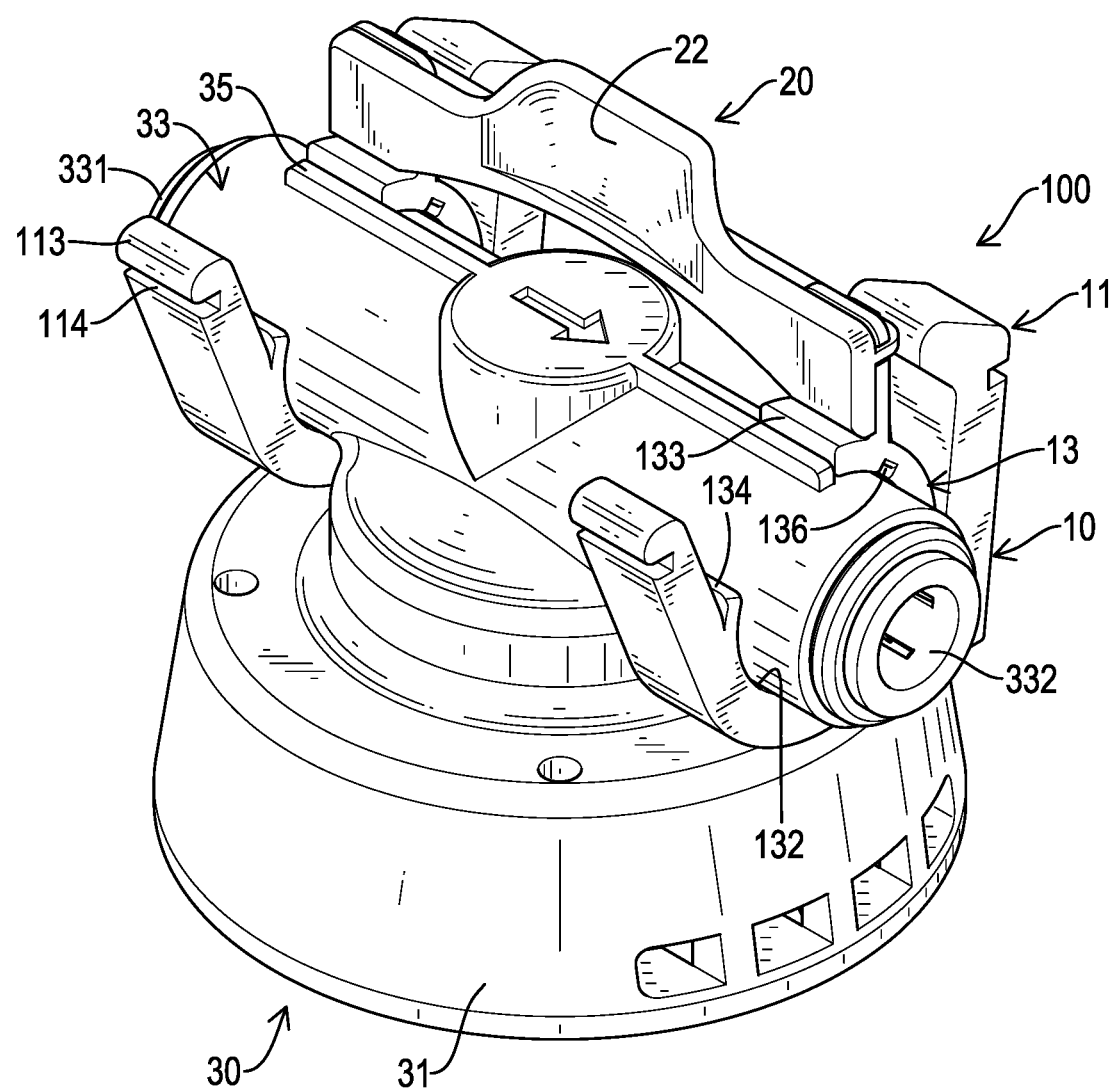
FIG. 1 is a perspective view of a first embodiment of a filter holder in accordance with the present invention.

With reference to FIGS. 1 to 4, a first embodiment of a filter holder 100 in accordance with the present invention is configured to be fixed to a bracket 50 and be detachably connected to a filter cartridge 60. The filter holder 100 comprises an assembling base 10, a trigger component 20, and a body 30.

The assembling base 10 is configured to be fixed to the bracket 50 and includes a mounting portion 11 and a body holder 13. The mounting portion 11 is configured to be fixed to the bracket 50. The mounting portion 11 may be fastened on the bracket 50 via fasteners or engaging structures. In the first embodiment, the mounting portion 11 includes at least one clip portion 113 for fastening to the bracket 50. Each clip portion 113 has a hooking groove 114 to allow an edge of the bracket 50 to be inserted into the hooking groove 114.

The body holder 13 is configured to hold the body 30, is integrally formed with the mounting portion 11, and has a connecting hole 132, a slit 134, a blocking end 133, and an engaging groove 136. The connecting hole 132 is transversally formed through the body holder 13. The slit 134 is transversally formed through the body holder 13, is formed through an external surface and an internal surface of the body holder 13, and communicates with the connecting hole 132 and a space outside the body holder 13. The blocking end 133 is located at a side of the slit 134. The engaging groove 136 is recessed in the body holder 13, communicates with the connecting hole 132, and is spaced apart from the slit 134 at an angular interval.

The trigger component 20 is connected to the body holder 13 of the assembling base 10 and is adjacent to the blocking end 133. Preferably, the assembling base 10 includes two sub-bases 15 transversally spaced apart from each other. The mounting portion 11 and the body holder 13 are formed at the two sub-bases 15. The trigger component 20 is connected to the two sub-bases 15. The trigger component 20 has a recess 22 formed in a side thereof facing the blocking end 133 and located between the two sub-bases 15. A user can press the trigger component 20 at the recess 22. The mounting portion 11 includes multiple clip portions 113 respectively formed at the two sub-bases 15. Each sub-base 15 includes two of the clip portions 113 respectively formed at opposite two sides of the sub-base 15. A spacing groove 14 is formed between one of the two clip portions 113 and the body holder 13. The spacing groove 14 provides a deformation space for the clip portion 113.

The body 30 is rotatably connected to the assembling base 10 and includes a cap 31, a connecting tube 33, and a locking rib 35. The cap 31 is configured to be connected to the filter cartridge 60 and is located below the body holder 13. The connecting tube 33 is formed on a top of the cap 31 and has an inlet end 331 and an outlet end 332 at opposite two ends of the connecting tube 33. Fluid flows into the connecting tube 33 via the inlet end 331, flows through the filter cartridge 60 to be filtered by the filter cartridge 60, and flows out from the connecting tube 33 via the outlet end 332. The connecting tube 33 is inserted into the connecting hole 132 of the body holder 13 and is able to be rotated relative to the body holder 13. The locking rib 35 protrudes from an external peripheral surface of the connecting tube 33.

Figure 2:
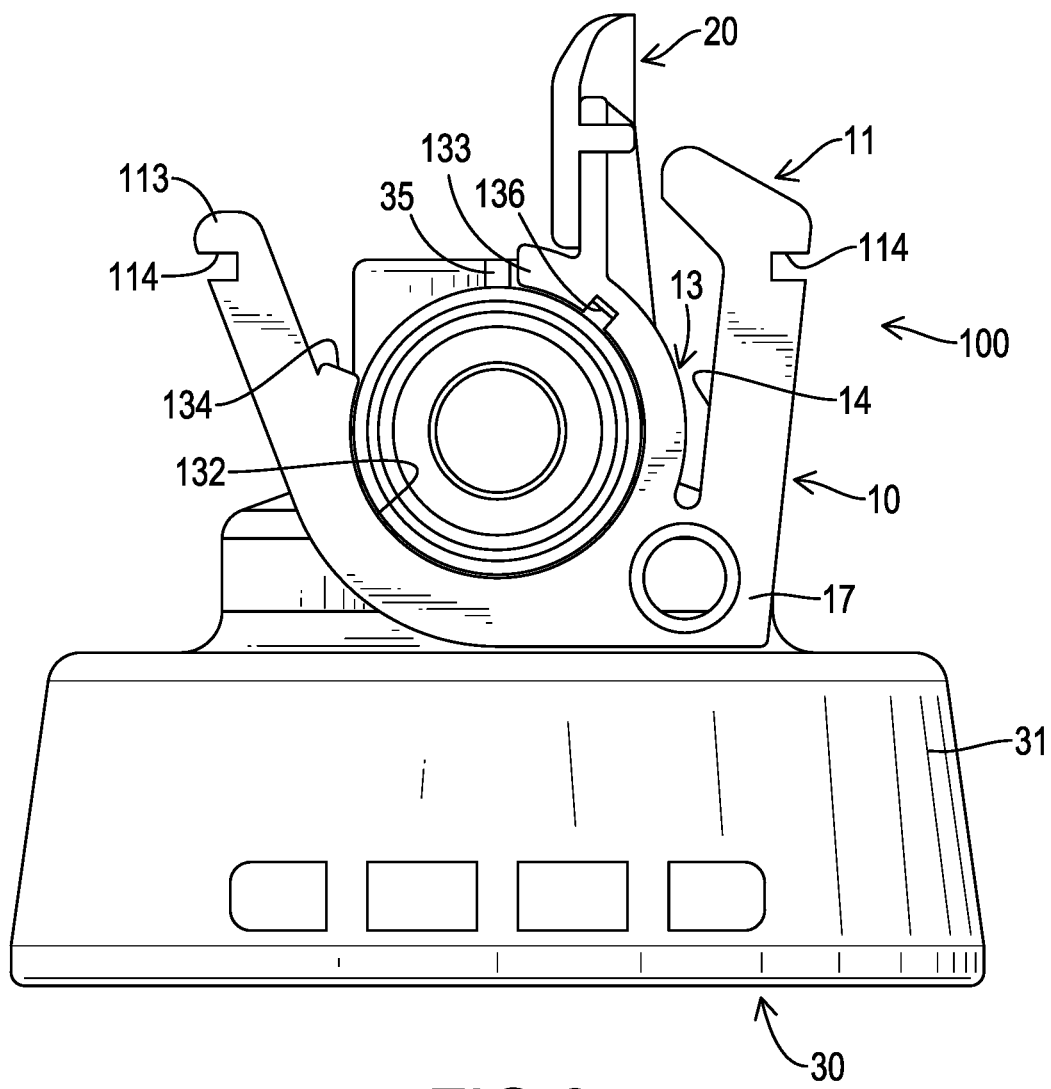
FIG. 2 is a side view of the filter holder in FIG. 1.
Figure 3:
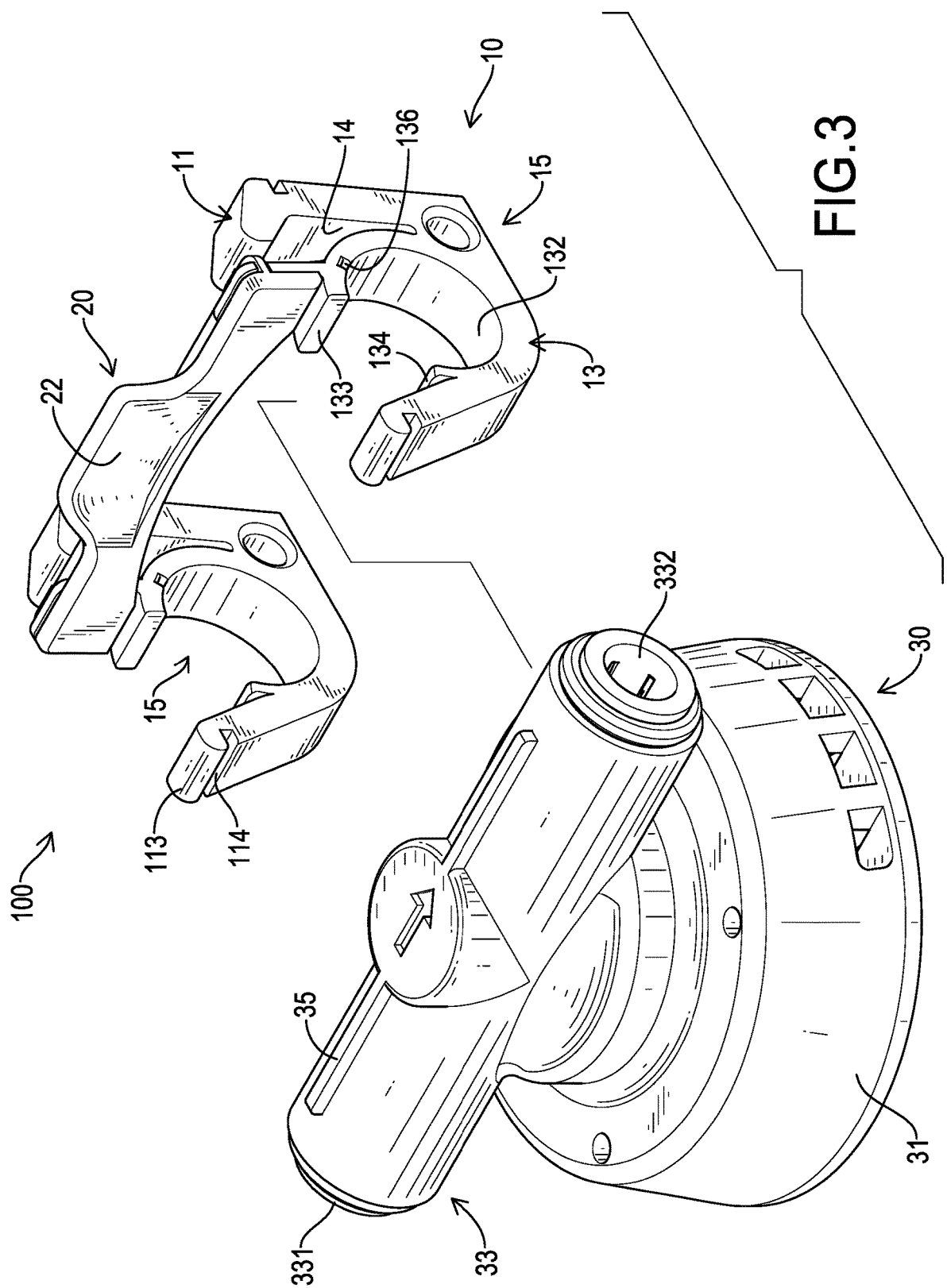
FIG. 3 is an exploded perspective view of the filter holder in FIG. 1.
Figure 4:
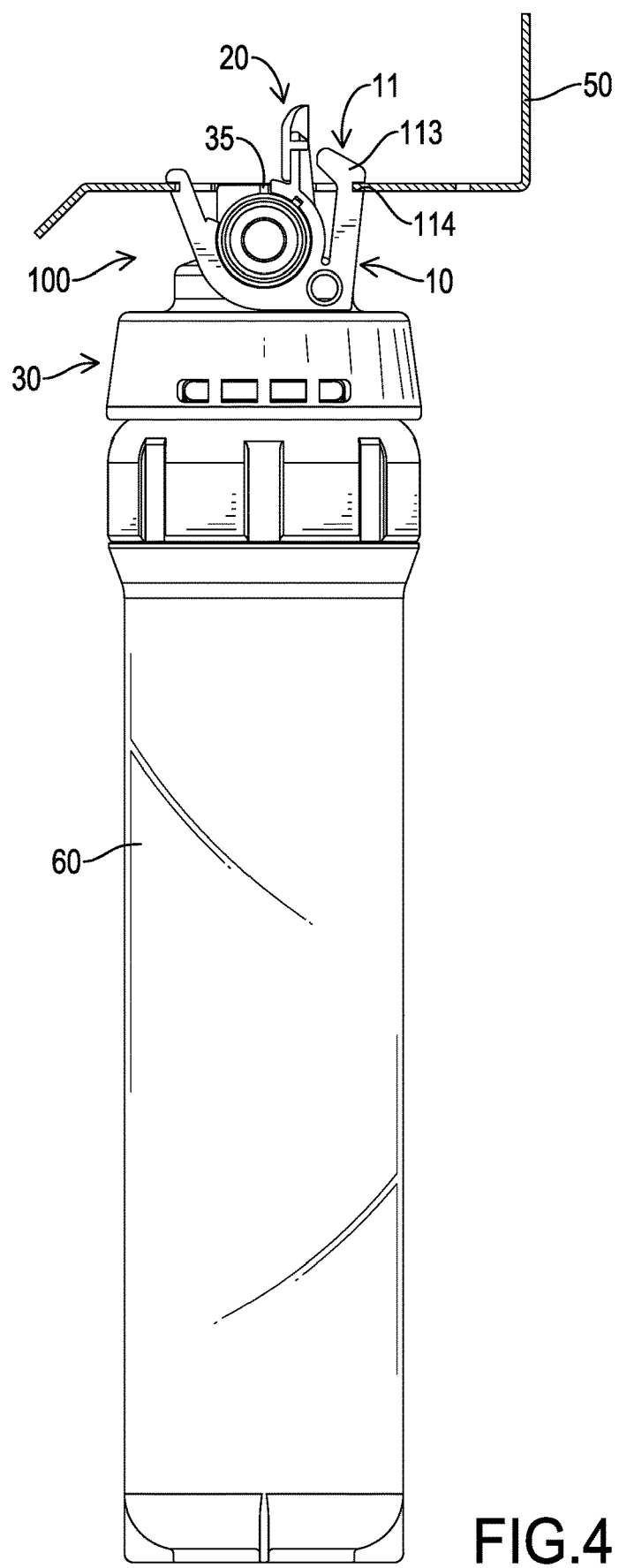
FIG. 4 is an operational side view of the filter holder in FIG. 1 showing that the filter holder is fixed on a bracket and is connected with a filter cartridge.
Figure 6:
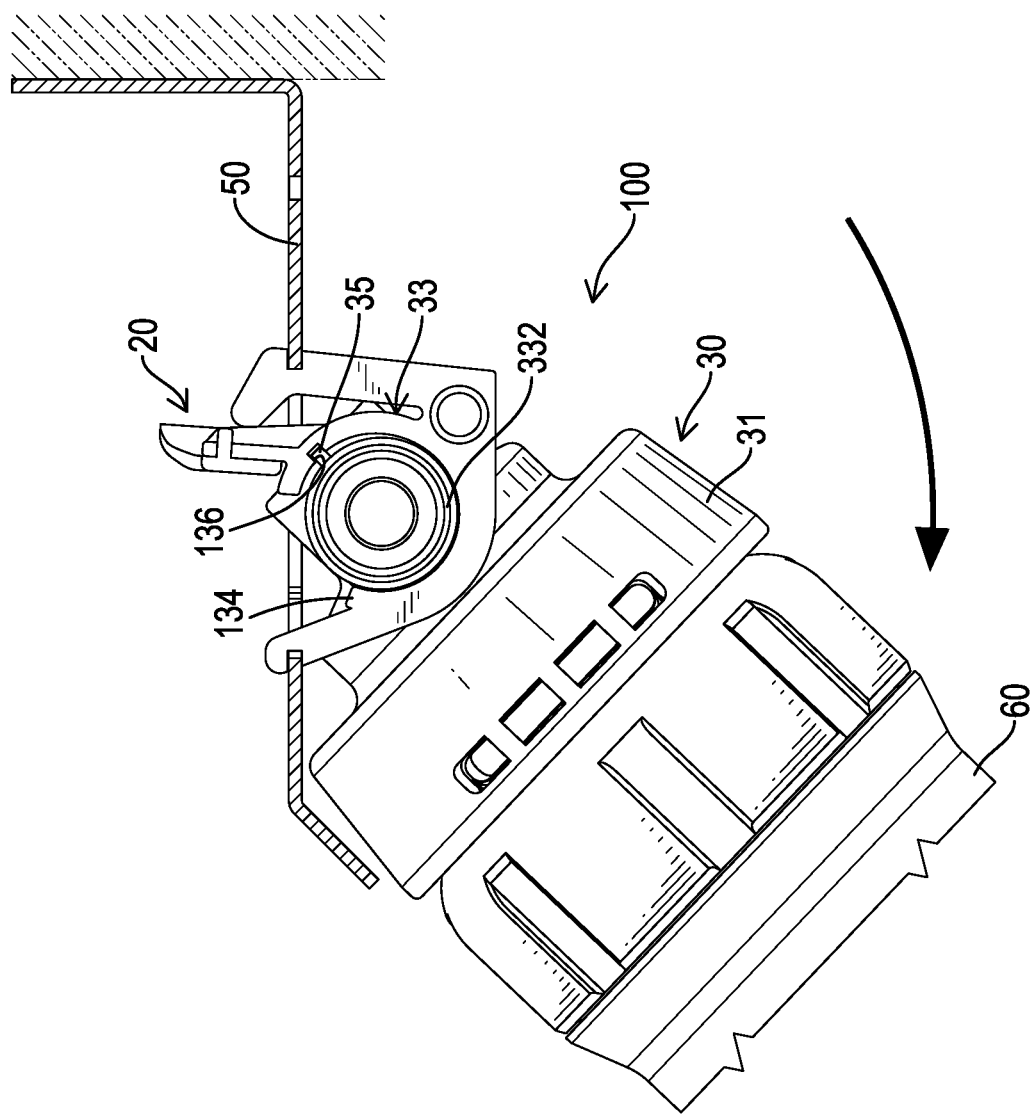
FIG. 6 is an operational side view of the filter holder in FIG. 4 showing that a body is rotated relative to the assembling base.

With reference to FIGS. 2 and 6, the body 30 has an initial position and a locking position. As shown in FIG. 2, when the body 30 is in the initial position, the locking rib 35 is located in the slit 134 of the body holder 13 and is blocked by the blocking end 133 of the body holder 13. As shown in FIG. 6, when the body 30 is in the locking position, the locking rib 35 is located in and engaged with the engaging groove 136 of the body holder 13.

Figure 5:
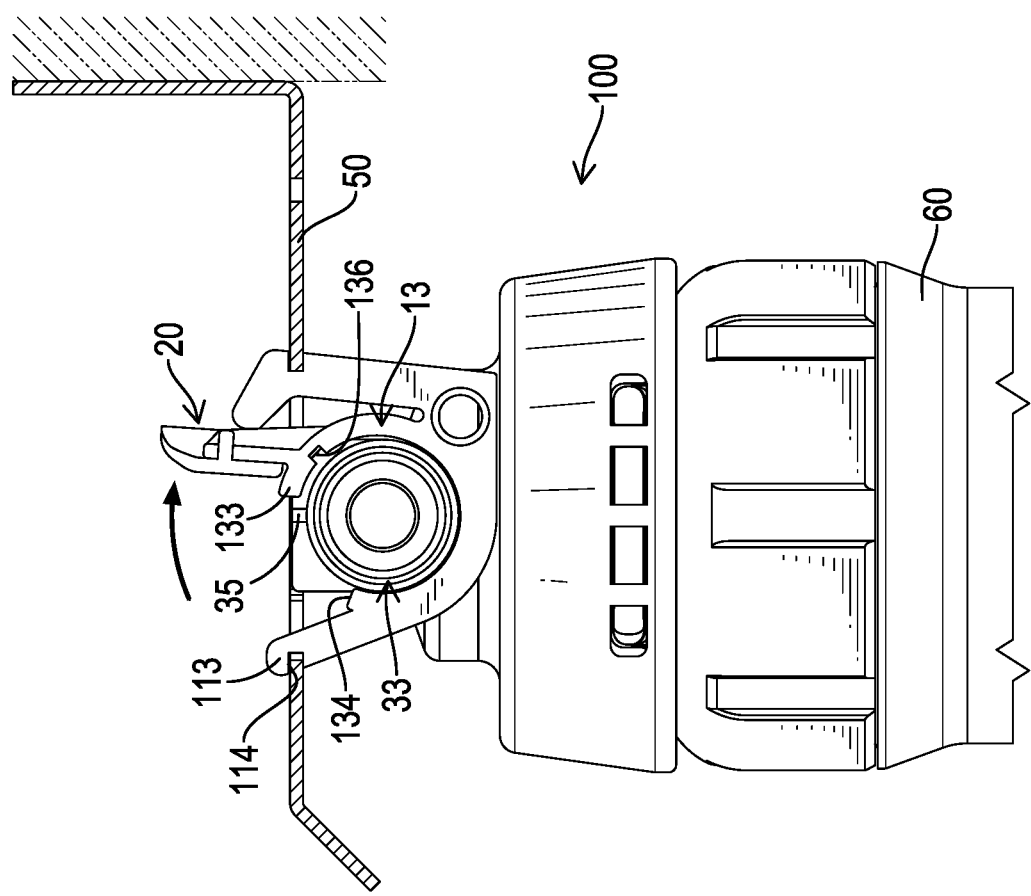
FIG. 5 is an operational side view of the filter holder in FIG. 4 showing that a trigger component is pressed.

With reference to FIGS. 5 and 6, when the trigger component 20 is pressed to move away from the slit 134, the body holder 13 is driven by the trigger component 20 to release the blocking end 133 from blocking the locking rib 35 or to release the engagement between the engaging groove 136 and the locking rib 35, so the connecting tube 33 of the body 30 can be rotated relative to the body holder 13 to turn the body 30 from the initial position to the locking position, or from the locking position to the initial position.

Figure 7:
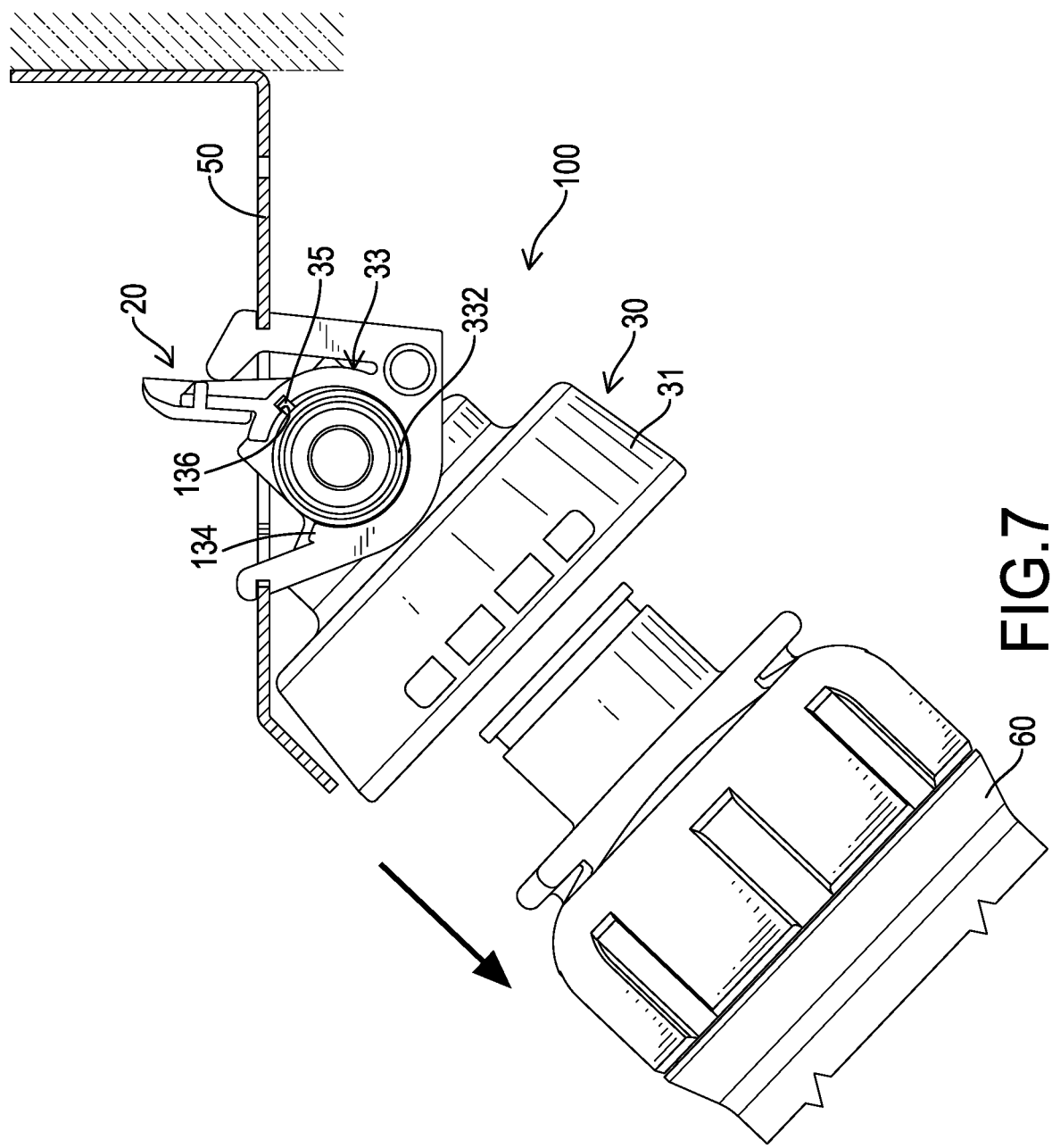
FIG. 7 is an operational side view of the filter holder in FIG. 4 showing that the filter cartridge is detached from the body.

With reference to FIGS. 5 to 7, to replace the filter cartridge 60, the user can press the trigger component 20 away from the slit 134 to release the blocking end 133 from blocking the locking rib 35 or can directly turn the filter cartridge 60 to force the locking rib 35 to pass through the blocking end 133 to adjust an orientation of the body 30 and to turn the filter cartridge 60 away from the ground. The body 30 can be rotated to the locking position such that the locking rib 35 engages with the engaging groove 136 to fix the orientation of the body 30, hereby increasing a room for detaching the filter cartridge 60 from the filter holder 100 and conveniently replacing the filter cartridge 60. After the filter cartridge 60 is replaced, the user presses the trigger component 20 away from the slit 134 to release the engagement between the engaging groove 136 and the locking rib 35, and turns the filter cartridge 60 back to the initial position. In the first embodiment, the blocking end 133 and the trigger component 20 are located at a rear side of the slit 134, so the user can press the trigger component 20 backwardly to release the engagement between the locking rib 35 and the engaging groove 136. In another embodiment, the blocking end 133 and the trigger component 20 may be located at a front side of the slit 134, so the user can press the trigger forwardly to release the engagement between the locking rib 35 and the engaging groove 136.

Figure 8:
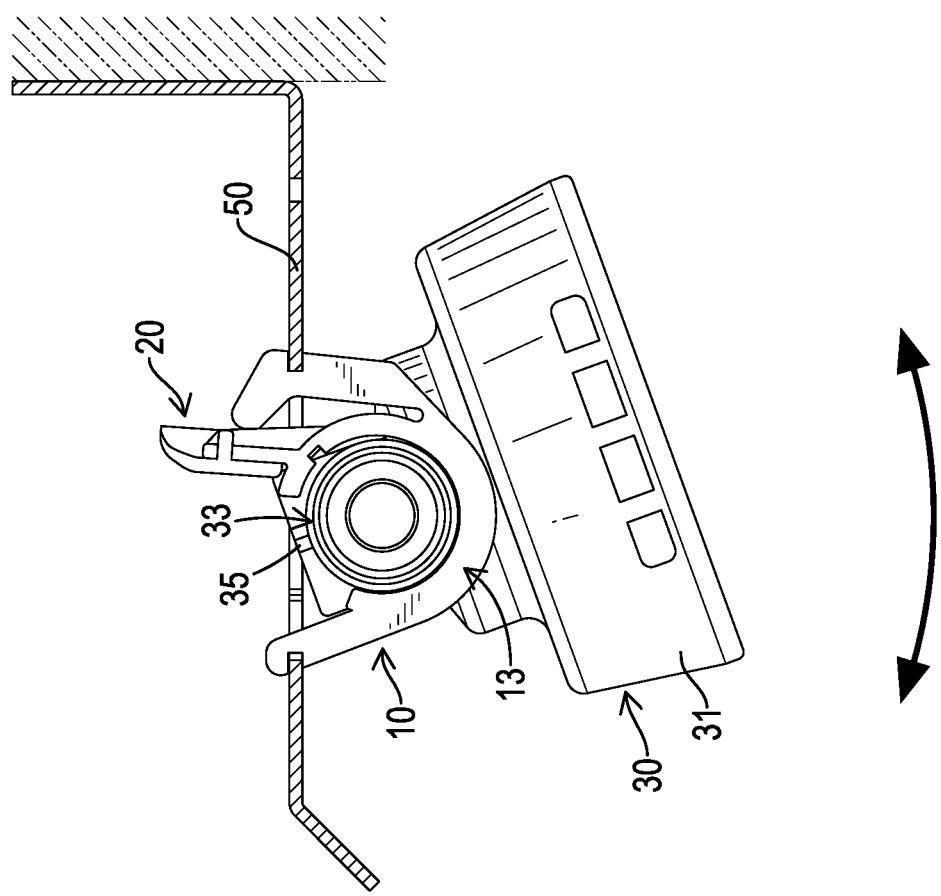
FIG. 8 is an operational side view of a second embodiment of a filter holder in accordance with the present invention.
Figure 9:
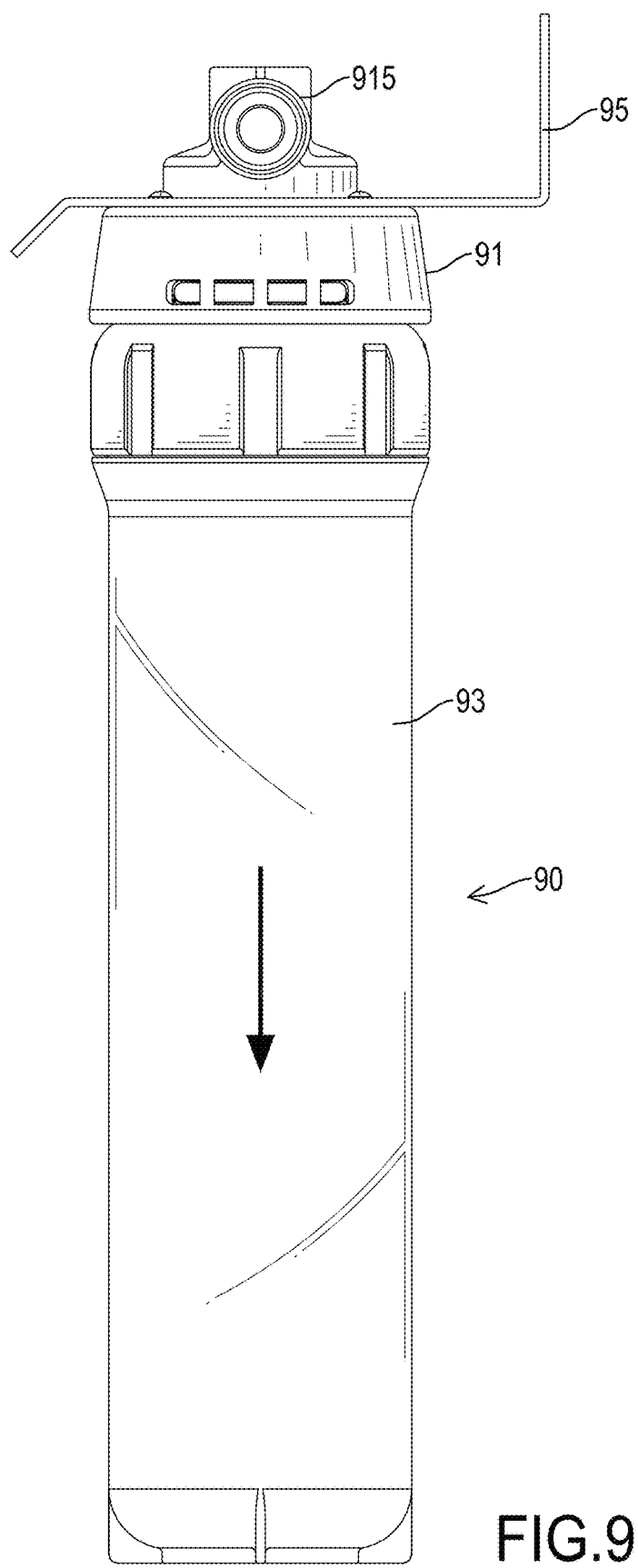
FIG. 9 is a side view of a conventional filter unit in accordance with a prior art.

With reference to FIG. 8, in the second embodiment, a bottom of the body holder 13 of the assembling base 10 is arched, so the body 30 can be rotated clockwise and counterclockwise. With reference to FIG. 2, in the first embodiment, the assembling base 10 may include a stopping block 17 protruding from a bottom of the body holder 13 at a side of the body holder 13 to block the cap 31. So the cap 31 is prevented from being turned toward the side where the stopping block 17 is located. Therefore, the body 30 can only be unidirectionally rotated relative to the assembling base 10.

With such arrangement, to replace the filter cartridge 60, the filter cartridge 60 can be rotated relative to the bracket 50 with the filter holder 100 of the present invention to move away from the ground, hereby increasing room for moving the filter cartridge 60 away from the filter holder 100 as the filter cartridge 60 is detached from the filter holder 100. Accordingly, the user can conveniently and easily replace the filter cartridge 60 from the filter holder 100 fixed on the bracket 50.

What is claimed is:

1. A filter holder comprising:
   an assembling base including:
   a mounting portion configured to be fixed to a bracket; and
   a body holder having:
   a connecting hole transversally formed through the body holder;
   a slit transversally formed through the body holder, formed through an external surface and an internal surface of the body holder, and communicating with the connecting hole and an outside of the body holder;
   a blocking end located at a side of the slit; and
   an engaging groove recessed in the body holder, communicating with the connecting hole, and spaced apart from the slit at an angular interval;
   a trigger component connected to the body holder of the assembling base and being adjacent to the blocking end; and
   a body rotatably connected to the assembling base and including:
   a cap configured to be connected to a filter cartridge;
   a connecting tube formed at a top of the cap and inserted into the connecting hole of the body holder; and
   a locking rib protruding from an external peripheral surface of the connecting tube; wherein
   the body has an initial position and a locking position;
   when the body is in the initial position, the locking rib of the body is located in the slit of the body holder of the assembling base;
   when the body is in the locking position, the locking rib is located in and engaged with the engaging groove of the body holder of the assembling base;
   the trigger component is configured to be pressed away from the slit to drive the body holder for releasing an engagement between the engaging groove of the body holder and the locking rib of the body.

2. The filter holder as claimed in claim 1, wherein
the assembling base includes two sub-bases transversally spaced apart from each other;
the mounting portion and the body holder are formed at the two sub-bases;
the trigger component is connected to the two sub-bases.

3. The filter holder as claimed in claim 1, wherein the mounting portion of the assembling base includes at least one clip portion for fastening to the bracket.

4. The filter holder as claimed in claim 2, wherein
the mounting portion of the assembling base includes multiple clip portions for fastening to the bracket; and
the multiple clip portions are respectively formed at the two sub-bases.

5. The filter holder as claimed in claim 4, wherein
each of the two sub-bases includes two of the multiple clip portions respectively formed at opposite two sides of the sub-base; and
a spacing groove is formed between one of the two clip portions of each of the two sub-bases and the body holder.

6. The filter holder as claimed in claim 1, wherein
the assembling base includes a stopping block protruding from a bottom of the body holder and located at a side of the body holder to block the cap of the body.

7. The filter holder as claimed in claim 2, wherein
the assembling base includes a stopping block protruding from a bottom of the body holder and located at a side of the body holder to block the cap of the body.

8. The filter holder as claimed in claim 3, wherein
the assembling base includes a stopping block protruding from a bottom of the body holder and located at a side of the body holder to block the cap of the body.

9. The filter holder as claimed in claim 4, wherein
the assembling base includes a stopping block protruding from a bottom of the body holder and located at a side of the body holder to block the cap of the body.

10. The filter holder as claimed in claim 5, wherein
the assembling base includes a stopping block protruding from a bottom of the body holder and located at a side of the body holder to block the cap of the body.

\* \* \* \* \*